(12) United States Patent
Ottens et al.

(10) Patent No.: US 11,242,501 B2
(45) Date of Patent: Feb. 8, 2022

(54) METHOD OF PRODUCING BEER HAVING A TAILORED FLAVOUR PROFILE

(71) Applicant: Heineken Supply Chain B.V., Amsterdam (NL)

(72) Inventors: Marcel Ottens, Delft (NL); Shima Saffarionpour, Delft (NL); Tom Reinoud Noordman, Oegstgeest (NL)

(73) Assignee: HEINEKEN SUPPLY CHAIN B.V., Amsterdam (NL)

( * ) Notice: Subject to any disclaimer, the term of this patent is extended or adjusted under 35 U.S.C. 154(b) by 12 days.

(21) Appl. No.: 16/740,933

(22) Filed: Jan. 13, 2020

(65) Prior Publication Data

US 2020/0148981 A1    May 14, 2020

Related U.S. Application Data

(63) Continuation of application No. 15/508,799, filed as application No. PCT/NL2015/050615 on Sep. 4, 2015, now Pat. No. 10,550,358.

(30) Foreign Application Priority Data

Sep. 5, 2014 (EP) ..................... 14183788

(51) Int. Cl.
| | |
|---|---|
| *C12C 11/11* | (2019.01) |
| *C12H 1/056* | (2006.01) |
| *C12H 1/07* | (2006.01) |
| *C12C 5/02* | (2006.01) |
| *C12H 1/04* | (2006.01) |

(52) U.S. Cl.
CPC .............. *C12C 11/11* (2013.01); *C12C 5/026* (2013.01); *C12H 1/0424* (2013.01); *C12H 1/0432* (2013.01); *C12H 1/063* (2013.01)

(58) Field of Classification Search
CPC .... C12H 1/0424; C12H 1/063; C12H 1/0432; C12C 5/026; C12C 11/11
See application file for complete search history.

(56) References Cited

U.S. PATENT DOCUMENTS

| | | |
|---|---|---|
| 4,766,000 A | 8/1988 | Sobus |
| 5,308,631 A | 5/1994 | Anglerot |
| 2002/0142410 A1 | 10/2002 | Rangel-Aldao et al. |
| 2003/0232108 A1 | 12/2003 | Effler |
| 2008/0213568 A1 | 9/2008 | Johannsen |
| 2011/0111086 A1 | 5/2011 | Lusk et al. |
| 2012/0015072 A1 | 1/2012 | Festersen et al. |
| 2012/0207909 A1 | 8/2012 | Itakura et al. |

FOREIGN PATENT DOCUMENTS

| | | |
|---|---|---|
| EP | 0 627 485 A1 | 12/1994 |
| WO | WO-2013/107598 A1 | 7/2013 |
| WO | WO-2013/179196 A1 | 10/2013 |

OTHER PUBLICATIONS

Guenther et al (EP 0 627 485 A1) machine translation (Year: 1994).*
Amberlite/Amberlyst et al., "Polymer products from Aldrich a 28 Table I: Classification and properties of numerous ion exchange resins offered by Aldrich strong cation exchangers on polystyrene ion exchange resins: classifications and properties", Feb. 2015, retrieved from the Internet: URL:http://www.sigmaaldrich.com/content/dam/signma-aldrich/docs/Aldrich/Brochure/al_pp_ionx.pdf.
Communication pursuant to Article 94(3) EPC for EP Application No. 15787046.0, dated May 13, 2019, 6 pages.
Extended European Search Report for EP Application No. 14183788.0, dated Feb. 27, 2015, 7 pages.
International Search Report issued in International Patent Application No. PCT/NL2015/050615, dated Jan. 18, 2016.
Thomas Barnes, "The complete beer fault guide v. 1.4", Jan. 2011, retrieved from the Internet: URL:http://www.carolinabrewmasters.com/PDF/Complete-Beer_Fault_Guide.pdf.

\* cited by examiner

*Primary Examiner* — Vera Stulii
(74) *Attorney, Agent, or Firm* — Foley & Lardner LLP (57) ABSTRACT

A method of producing beer having a tailored flavour profile is provided comprising the successive steps of: (a) fermenting wort containing fermentable sugars with yeast to produce beer containing 1-10 vol. % ethanol and flavour substances diacetyl; acetaldehyde; dimethyl sulfide; ethyl acetate; isoamyl acetate; ethyl valerate; ethyl hexanoate; iso-amyl alcohol and 2-methylbutan-1-ol; (b) contacting the fermenting wort or beer with porous adsorbent particles, selectively adsorbing the beer flavour esters ethyl acetate, ethyl hexanoate, ethyl valerate and isoamyl acetate; (c) separating the adsorbent particles; (d) desorbing a portion of the beer flavour esters from the adsorbent particles; and (e) adding a fraction of the desorbed beer flavour esters to the flavour adjusted beer or to another beer, wherein the amount of beer flavour esters added is 5-95 wt. % of the amount of beer flavour esters removed by the adsorbent particles.

16 Claims, 6 Drawing Sheets

METHOD OF PRODUCING BEER HAVING A TAILORED FLAVOUR PROFILE

CROSS-REFERENCE TO RELATED APPLICATIONS

This application is a continuation of U.S. application Ser. No. 15/508,799, filed on Mar. 3, 2017, which is a 371 National Application of International Application No. PCT/NL2015/050615, filed on Sep. 4, 2015, which claims the benefit of and priority to EP Application No. 14183788.0, filed on Sep. 5, 2014, all of which are hereby incorporated by reference herein in their entireties.

TECHNICAL FIELD OF THE INVENTION

The present invention relates to a method of producing beer having a tailored flavour profile. More particularly, the invention provides a method of producing beer that comprises the successive steps of:

fermenting a wort containing fermentable sugars with an active yeast to produce a beer containing ethanol and beer flavour substances:

contacting the fermenting wort or the beer with porous adsorbent particles to selectively adsorb one or more of these beer flavour substances; and separating the adsorbent particles containing one or more adsorbed beer flavour substances from the beer to produce a flavour adjusted beer.

BACKGROUND OF THE INVENTION

The term "beer" is commonly used to refer to an alcoholic beverage produced by the saccharification of starch and fermentation of the resulting sugars. The starch and saccharification enzymes are often derived from malted cereal grains, most commonly malted barley. Most beer is also flavoured with hops, which add bitterness. The preparation of beer is called brewing. There are several steps in the traditional brewing process, which usually include malting, mashing, lautering, boiling, fermenting, conditioning, filtering, and packaging. Traditionally, brewing processes are conducted in a batch-wise fashion, However, continuous brewing processes are also known in the art.

Malting is the process where barley grain is made ready for brewing. Malting is broken down into three steps in order to help to release the starches in the barley. First, during steeping, the grain is added to a vat with water and allowed to soak for approximately 40 hours. During germination, the grain is spread out on the floor of the germination room for around 5 days. The final part of malting is kilning when the malt goes through a very high temperature drying in a kiln; with gradual temperature increase over several hours. When kilning is complete, the grains are now termed malt. The malt grains are milled or crushed to break apart the kernels and expose the cotyledon, which contains the majority of the carbohydrates and sugars; this makes it easier to extract the sugars during mashing.

Mashing converts the starches released during the malting stage into sugars that can be fermented. Mashing typically comprises mixing of the milled grain with hot water in a large vessel known as a mash tun. In this vessel, the grain and water are mixed together to create a cereal mash. During the mash, naturally occurring enzymes present in the malt convert the starches (long chain carbohydrates) in the grain into smaller molecules or simple sugars (mono-, di-, and tri-saccharides). This "conversion" is called saccharification. The result of the mashing process is a sugar rich liquid or "wort", which is usually filtered over a mash filter or in a lauter tun using husks of the barley/malt as a natural filter aid in a process known as lautering. Prior to lautering, the mash temperature is usually raised to about 75-78° C. to deactivate enzymes.

Additional water may be sprinkled on the grains to extract additional sugars (a process known as sparging).

The wort is usually moved into a large tank or kettle where it is boiled with hops and sometimes other ingredients such as herbs or sugars. The boiling process serves to terminate enzymatic processes, precipitate proteins, isomerize hop resins, and concentrate and sterilize the wort. Hops add flavour, aroma and bitterness to the beer. At the end of the boil, it is customary to clarify the hopped wort in a vessel called a "whirlpool", where the more solid particles in the wort are separated out.

After the whirlpool, the wort is rapidly cooled via a heat exchanger to a temperature where yeast can be added. The cooled wort goes into a fermentation tank. Yeast is added, or "pitched", to the fermentation tank. The fermenting process begins, where the sugars turn into alcohol, carbon dioxide and other components, including flavour substances. When the fermentation is complete the brewer may subject the beer to a "conditioning" treatment. Conditioning of the beer is the process in which the beer ages, the flavour becomes smoother, and flavours that are unwanted dissipate. After conditioning for a week to several months, the beer may be filtered and force carbonated for bottling, or fined in the cask.

The flavour (taste and smell) of beer is determined by flavour substances that originate from raw materials (malt, hop) as well as by flavour substances that are formed in the course of the brewing process, notably during heat treatments (mashing, wort boiling) and fermentation. The relative concentration levels of these flavour substances in beer are affected by (bio)chemical reactions that lead to their formation as well as by bio(chemical) reactions that lead to their disappearance.

Beer contains a large number of different flavour substances, including volatile and non-volatile components. Important beer flavour substances include hydrophobic as well as hydrophilic compounds. The relative concentration levels in which these flavour substances occur in a beer determine the flavour character or flavour profile of the beer. A major challenge for every brewer is to ensure constant flavour quality, and especially to minimize batch-to-batch variations in flavour quality.

Since quality and composition of the natural raw materials used in beer brewing tend to vary and given that the flavour generation pathways responsible for the formation of flavour substances during brewing are affected by many different factors, it is evident that maintaining constant beer flavour quality is indeed a very difficult task.

Brewers are also continuously searching for ways to produce new types of beers with unique, appealing flavour profiles, preferably without resorting to the addition of flavourings or of other flavour contributing ingredients.

US 2002/0142410 describes a method of stabilizing the flavour of a fermented malt beverage comprising contacting said beverage with a reductase enzyme to inhibit, block, reduce, bind or inactivate Maillard reaction intermediates.

US 2011/0111086 describes a method for improving the flavour stability of a fermented beverage produced, the method comprising: adding an antioxidant (3,4-hydroxytryosol) prior to, or during an early stage of, fermentation.

US 2012/0015072 describes a method for producing a beer, comprising adding a catalase composition to the mash, the fermenting wort, the green beer and/or the fermented beer so as to improve the flavour and/or flavour stability of the finished beer.

US 2012/0207909 describes a method for producing an unfermented beer-flavoured malt beverage, comprising contacting a wort with activated carbon to reduce an unpleasant wort flavour.

US 2003/232108 describes a method for the production of a flavorless malt based solution by subjecting fermented intermediate beer to treatment with adsorption exchange resin to remove undesirable colors, odors and/or flavors.

EP-A 0 627 485 describes a method for the removal of unwanted components from beer, comprising: removing both undesirable and desirable components, separating the undesirable and desirable components and adding back the desirable components. Examples 1 and 2 describe the chromatographic isolation of beer flavour components from dialysis permeate from the production of alcohol-free beer (Example 1) and yeast sediment (Example 2). Example 3 describes the addition of the isolated flavour concentrates to alcohol-free beer.

US 2008/213568 describes a beaded polyether resin that can be used to scavenge undesirable compounds, notably carbonyl and/or sulfonyl compounds, from fermented products such as beer, cider or wine.

U.S. Pat. No. 5,308,631 describes a process for obtaining alcohol-free beer from a naturally alcoholic beer, consisting of:
a) bringing into contact an alcoholic beer with a solid adsorbent consisting of a hydrophobic zeolite to form an aqueous eluent phase and products adsorbed on said adsorbent;
b) separating the aqueous eluent phase from the adsorbent;
c) thermally desorbing said adsorbed products to form a desorbed phase;
d) recovering the desorbed phase;
e) separating the desorbed phase into an alcoholic phase and an aromatic aqueous phase; and
f) reconstituting an alcohol-free beer by mixing the aqueous phases recovered at the end of (b) and (e).

Polyvinylpolypyrrolidone (PVPP) particles are used by brewers to remove components that cause so called 'chill haze' in beer. Colloidal haze in beer arises from the formation of polyphenol-protein complexes during storage. Fresh beer contains acidic proteins and a variety of polyphenols. As these small polyphenols, termed flavanoids, polymerise and oxidise, they produce short chain (condensed) polyphenols termed tannoids. These tannoids are capable of bridging across a number of proteins through hydrogen bonding to form reversible chill haze. After further storage, stronger ionic and covalent bonds form between the tannoids and proteins resulting in irreversible permanent haze. Since the rate-determining factor in the development of haze is the change in the polyphenol fraction, reducing the levels of these haze precursors is a very efficient method of ensuring the colloidal stability of beer. PVPP is a cross-linked polymer that selectively complexes haze polyphenols, predominantly through very strong hydrogen bonding, with multiple attachment sides for haze polyphenols.

U.S. Pat. No. 4,766,000 describes a method for treating beer to prevent chill haze comprising contacting said beer with a combination of partially hydrophobic adsorbent and a silica gel, wherein the partially hydrophobic adsorbent is a precipitated silica reacted with up to 7% wt/wt of a silicone, wherein said silicone is dimethyl siloxane.

SUMMARY OF THE INVENTION

The flavour profile of beer is strongly dependent on the concentration levels of certain volatile beer flavour substances that are formed during fermentation. Typical examples of such beer flavour substances include:
diacetyl (butane-2,3-dione);
acetaldehyde;
dimethyl sulfide;
ethyl acetate;
isoamyl acetate (3-methyl-1-butylacetate);
ethyl valerate (ethyl pentanoate);
ethyl hexanoate;
iso-amyl alcohols (3-methylbutan-1-ol);
2-methylbutan-1-ol;

The inventors have discovered that the flavour profile of beer can be altered in an advantageous manner by selectively reducing the concentration levels of some of these flavour substances. This selective reduction can be achieved in a very effective and simple manner by contacting the beer, during or after fermentation, with porous adsorbent particles that selectively adsorb one or more of said beer flavour substances, and by subsequently separating the adsorbent particles containing the adsorbed beer flavour substances from the beer. It was further found that it can be beneficial to desorb a portion of the adsorbed beer flavour substances from the separated adsorbent particles and to add this portion back to the treated beer or another beer.

Thus, the present invention provides a method for selectively adjusting the concentration levels of the aforementioned flavour substances in beer by contacting the beer with adsorbent particles that have a high (selective) affinity for at least some of these flavour substances, followed by removal of the adsorbent particles including the flavour substances adsorbed thereto. After removal of the adsorbent particles the flavour substances may optionally be desorbed from these particles and a fraction enriched in one or more desirable flavour substance can be added back to the treated beer or another beer so as to achieve a desired flavour profile. This embodiment is particularly useful for optimising the concentration levels of beer flavour esters (ethyl acetate, ethyl hexanoate, ethyl valerate and isoamyl acetate).

Furthermore, undesired flavour deviations resulting from elevated concentration levels of one or more of the aforementioned beer flavour substances may be corrected effectively by (selectively) removing at least a part of these flavour substances using adsorbent particles with a high affinity for these substances. This embodiment is particularly suitable for reducing the levels of diacetyl, acetaldehyde and/or dimethyl sulfide.

The adsorbent particles employed in accordance with the present invention have an affinity for one or more of the aforementioned beer flavour substances, thus enabling the selective removal of at least one of these beer flavour substances. In addition, the adsorbent particles typically have a low affinity for ethanol.

One embodiment of the present invention relates to the use of adsorbent particles that have a high affinity for the ester substances ethyl acetate, isoamyl acetate, ethyl valerate and ethyl hexanoate and a lower affinity for ethanol and the other beer flavour substances. Another embodiment of invention relates to the use of adsorbent particles that have a high affinity for acetaldehyde, diacetyl, dimethyl sulfide and a lower affinity for ethanol and the other beer flavour substances.

Consequently, one aspect of the present invention relates to a method of brewing beer, comprising the successive steps of:

a) fermenting a wort containing fermentable sugars with an active yeast to produce a beer containing 1-10 vol. % ethanol and further containing the beer flavour substances diacetyl; acetaldehyde; dimethyl sulfide; ethyl acetate; iso-amyl acetate; ethyl valerate; ethyl hexanoate; iso-amyl alcohol and 2-methylbutan-1-ol;

b) contacting the fermenting wort or the beer with porous adsorbent particles to selectively adsorb the beer flavour esters ethyl acetate, ethyl hexanoate, ethyl valerate and isoamyl acetate;

c) separating the adsorbent particles containing the adsorbed beer flavour esters from the beer to produce a flavour adjusted beer containing 1-10 vol. % ethanol;

d) desorbing at least a portion of the beer flavour esters from the separated adsorbent particles; and e) adding at least a fraction of the desorbed beer flavour esters to the flavour adjusted beer or to another beer, wherein the amount of beer flavour esters that is added to the flavour adjusted beer represents 5-95 wt. % of the amount of beer flavour esters that was removed from the beer by the adsorbent particles;

wherein the adsorbent particles' affinity ratio $\theta_1$ for at least one of the beer flavour esters exceeds 5;

the affinity ratio $\theta_i$ for beer flavour ester i being defined by the following equation:

$$\theta_1 = K_i/K_{ethanol};$$

wherein:

$K_i$ represents the adsorbent particles' affinity constant for beer flavour ester i;

$K_{ethanol}$ represents the adsorbent particles' affinity constant for ethanol.

Another aspect of the present invention relates to a method of brewing beer, comprising the successive steps of:

a) fermenting a wort containing fermentable sugars with an active yeast to produce a beer containing 1-10 vol. % ethanol and further containing the beer flavour substances diacetyl;

acetaldehyde; dimethyl sulfide; ethyl acetate; isoamyl acetate; ethyl valerate; ethyl hexanoate; iso-amyl alcohol and 2-methylbutan-1-ol;

b) contacting the fermenting wort or the beer with porous adsorbent particles to selectively adsorb one or more surplus flavour substances selected from diacetyl, acetaldehyde and dimethyl sulfide; and c) separating the adsorbent particles containing the one or more adsorbed surplus flavour substances from the beer to produce a flavour adjusted beer containing 1-10 vol. % ethanol; wherein the porous adsorbent particles comprise an adsorbent containing amine functionalities; and wherein the adsorbent particles' affinity ratio $\theta_1$ for at least one of the surplus flavour substances exceeds 5; the affinity ratio $\theta_1$ for surplus flavour substance i being defined by the following equation;

$$\theta_1 = K_i/K_{ethanol};$$

wherein:

$K_i$ represents the adsorbent particles' affinity constant for surplus flavour substance i;

$K_{ethanol}$ represents the adsorbent particles' affinity constant for ethanol.

The treatment with adsorbent particles in accordance with methods of the present invention offers the important advantage that the concentration levels of important beer flavour substances in the final beer can be controlled very accurately as the impact of the treatment on these concentrations can be reliably predicted. This method enables selective adjustment of the concentration levels of important beer flavour substances, meaning that the flavour impact of these flavour substances may be reduced without significantly affecting the flavour impact of other (important) beer flavour substances, and without significantly affecting the concentrations of other beer components, including ethanol and hop acids.

DETAILED DESCRIPTION OF THE INVENTION

A first aspect of the present invention relates to a method of brewing beer, said method comprising the successive steps of:

a) fermenting a wort containing fermentable sugars with an active yeast to produce a beer containing 1-10 vol. % ethanol and further containing the beer flavour substances diacetyl;

acetaldehyde; dimethyl sulfide; ethyl acetate; isoamyl acetate; ethyl valerate; ethyl hexanoate; iso-amyl alcohol and 2-methylbutan-1-ol;

b) contacting the fermenting wort or the beer with porous adsorbent particles to selectively adsorb the beer flavour esters ethyl acetate, ethyl hexanoate, ethyl valerate and isoamyl acetate;

c) separating the adsorbent particles containing the adsorbed beer flavour esters from the beer to produce a flavour adjusted beer containing 1-10 vol. % ethanol;

d) desorbing at least a portion of the beer flavour esters from the separated adsorbent particles; and e) adding at least a fraction of the desorbed beer flavour esters to the flavour adjusted beer or to another beer, wherein the amount of beer flavour esters that is added to the flavour adjusted beer represents 5-95 wt. % of the amount of beer flavour esters that was removed from the beer by the adsorbent particles;

wherein the adsorbent particles' affinity ratio $\theta_1$ for at least one of the beer flavour esters exceeds 5;

the affinity ratio $\theta_i$ for beer flavour ester i being defined by the following equation:

$$\theta_1 = K_i/K_{ethanol};$$

wherein:

$K_i$ represents the adsorbent particles' affinity constant for beer flavour ester i;

$K_{ethanol}$ represents the adsorbent particles' affinity constant for ethanol.

The term "amyl alcohols" as used herein refers to alcohols with the fomula $C_5H_{11}OH$. Typical examples include pentan-1-ol, 3-methylbutan-1-ol and 2-methylbutan-1-ol.

The affinity constant '$K_i$' (expressed in L/g adsorbent) corresponds to the initial slope of the Langmuir adsorption isotherm and is a measure of the affinity of the porous adsorbent particles for a certain (flavour) substance. The affinity constant can suitably be determined by the method described in Example 1.

The present method enables selective removal of the beer flavour esters ethyl acetate, isoamyl acetate, ethyl valerate and ethyl hexanoate, followed by desorption and add-back of only a fraction of these beer flavour esters. This particular embodiment is further illustrated in the following table which shows the normalized concentrations of 4 different beer flavour esters before treatment with adsorbent particles, after treatment with adsorbent particles and after add-back of a fraction of the adsorbed beer flavour esters.

|  | Before treatment | After treatment | After add-back |
|---|---|---|---|
| Ethyl acetate | 100 | 60 | 60 |
| Isoamyl acetate | 100 | 40 | 95 |
| Ethyl valerate | 100 | 40 | 90 |
| Ethyl hexanoate | 100 | 35 | 75 |

In one advantageous embodiment of the invention, the affinity ratio $\theta_i$ for at least one of the beer flavour esters exceeds 10 and most preferably it exceeds 20, said at least one beer flavour esters being selected from ethyl acetate, isoamyl acetate, ethyl valerate and ethyl hexanoate.

In a particularly advantageous embodiment of the invention, the present method is used to adjust the relative concentration levels in which the beer flavour esters occur in the beer. To this end it is preferred that the adsorbent particles employed have an affinity constant for one of these beer flavour esters that is at least 2 times higher or lower than the particles' affinity constant for one of the other beer flavour esters.

The flavour of many beers is clearly affected by the ratio in which the esters ethyl acetate and isoamyl acetate occur in the beer. Consequently, it is advantageous to be able to control this ratio in the end product. The present method is particularly useful for manipulating the ratio between the ethyl acetate concentration and the isoamyl acetate concentration. Consequently, in an advantageous embodiment of the present method the ratio between the concentration [ethyl acetate]/[isoamyl acetate] in the flavour adjusted beer differs by at least a factor 2 from the same concentration ratio in the adsorbent particles after separation, wherein both [ethyl acetate] and [isoamyl acetate] refer to the concentration in mg/g. Most preferably, the ratio [ethyl acetate]/[isoamyl acetate] in the flavour adjusted beer is at least a factor 2 lower than the same ratio in the adsorbent particles after separation.

Preferably, step e) of the present method comprises desorbing at least one or more beer flavour esters selected from ethyl acetate, isoamyl acetate, ethyl valerate and ethyl hexanoate and adding at least one or more of said flavour esters to the flavour adjusted beer. Typically, the amount of beer flavour esters that is added to the flavour adjusted beer represents 10-90 wt. %, more preferably 20-80 wt. % of the amount of beer flavour esters that was removed from the beer by the adsorbent particles.

According to a particularly preferred embodiment, the addition of the desorbed beer flavour esters to the flavour adjusted beer yields a beer in which the weight ratio of the following combinations of beer flavour esters has been adjusted by at least a factor 1.2, more preferably by at least a factor 1.5 and most preferably by a factor 2.0:

Ethyl acetate/Isoamyl acetate
Ethyl hexanoate/Ethyl acetate
Ethyl valerate/Ethyl acetate
Ethyl hexanoate/Isoamyl acetate
Ethyl valerate/Isoamyl acetate The method of the present invention can suitably be used to reduce the concentration levels of beer flavour substances that otherwise would be present in the final beer in undesirably high concentration levels. Especially the beer flavour substances diacetyl, acetaldehyde and dimethyl sulfide are frequently formed in beer during the brewing process in undesirably high conconcentration levels. Hence, selective removal of one or more of these beer flavour substances is an advantageous embodiment of the present invention.

Accordingly, another aspect of the present invention relates to a method of brewing beer, comprising the successive steps of:

a) fermenting a wort containing fermentable sugars with an active yeast to produce a beer containing 1-10 vol. % ethanol and further containing the beer flavour substances diacetyl; acetaldehyde; dimethyl sulfide; ethyl acetate; iso-amyl acetate; ethyl valerate; ethyl hexanoate; iso-amyl alcohol and 2-methylbutan-1-ol;

b) contacting the fermenting wort or the beer with porous adsorbent particles to selectively adsorb one or more surplus flavour substances selected from diacetyl, acetaldehyde and dimethyl sulfide; and c) separating the adsorbent particles containing the one or more adsorbed surplus flavour substances from the beer to produce a flavour adjusted beer containing 1-10 vol. % ethanol;

wherein the porous adsorbent particles comprise an adsorbent containing amine functionalities; and wherein the adsorbent particles' affinity ratio $\theta_i$ for at least one of the surplus flavour substances exceeds 5;

the affinity ratio $\theta_i$ for surplus flavour substance i being defined by the following equation;

$$\theta_i = K_i/K_{ethanol};$$

wherein:

$K_i$ represents the adsorbent particles' affinity constant for surplus flavour substance i;

$K_{ethanol}$ represents the adsorbent particles' affinity constant for ethanol.

In an advantageous embodiment of the aforementioned method, the affinity ratio $\theta_i$ for diacetyl exceeds 5, more preferably it exceeds 10 and most preferably it exceeds 20.

Preferably, the present method is used to substantially reduce the diacetyl concentration relative to the ethyl acetate content of the beer. To this end it is preferred that the adsorbent particles employed have an affinity constant for diacetyl that is at least 3 times higher, more preferably at least 5 times higher than the particles' affinity constant for ethyl acetate.

In order to effectively reduce the diacetyl content of the final beer, it is preferred to contact the beer with the adsorbent particles after the beer has been heated to a temperature of at least 60° C. for at least 5 minutes, more preferably for at least 15 minutes. By heating the beer, the diacetyl precursor alpha-acetolactate is converted into diacetyl. Contacting of the beer with the adsorbent particles after this heat treatment offers the advantage that diacetyl content of the beer will remain stable after the contacting with the adsorbent particles.

In a further preferred embodiment of the invention, the affinity ratio $\theta_i$ for acetaldehyde exceeds 5, more preferably it exceeds 10. and most preferably it exceeds 20.

In yet another preferred embodiment of the invention, the affinity ratio $\theta_i$ for dimethyl sulfide exceeds 5, more preferably it exceeds 10. and most preferably it exceeds 20.

In yet another advantageous embodiment of the invention, the affinity ratio $\theta_i$ for isoamyl alcohol exceeds 5, more preferably it exceeds 10 and most preferably it exceeds 20.

In accordance with one embodiment of the present invention, yeast is separated from the beer before the beer is contacted with the adsorbent particles. This embodiment offers the advantage that, following removal of the adsorbent particles from the beer, these particles may be regenerated for re-use without difficulty. Also desorption of beer flavour substances from the adsorbent particles is easier if yeast has been removed from the beer before the contacting with the adsorbent particles.

In accordance with another embodiment, the adsorbent particles are added to yeast containing wort or beer, and yeast and the adsorbent particles are simultaneously separated from the beer to produce the flavour adjusted beer. This embodiment of the present method has the benefit that yeast and adsorbent particles are separated in a single operation.

Addition of the adsorbent particles to the fermenting wort offers the advantage that it allows the selective removal of beer flavour substances even if the adsorbent particles' affinity for these beer flavour substances is comparable. By adding the adsorbent particles at a stage of the fermentation when the concentration of a first beer flavour substance is close to its maximum while that of a second flavour substance is still low, and by subsequently removing the adsorbent particles before the fermentative production of the second flavour substance increases, the first beer flavour can be removed preferentially even if the adsorbent particles' affinity for these two flavour substances is similar.

The contacting of the fermenting wort or the beer with the adsorbent particles can be done in different ways. One option encompassed by the present invention is to mix the adsorbent particles with the fermenting wort or the beer. Subsequently, the adsorbent particles can suitably be separated from the beer by means of filtration and/or centrifugation, most preferably by filtration.

The invention also encompasses an embodiment in which the contacting with the adsorbent particles is achieved by passing the beer through a bed of the adsorbent particles. This embodiment offers the advantage that no separation step is required to remove the adsorbent particles from the beer. Also desorption of the adsorbed beer flavour substances can be achieved relatively easily by passing an eluent through the bed of adsorbent particles after the flavour adjusted beer has been separated from this bed.

An important benefit of the present method lies in the selective removal of one or more important beer flavour substances, without substantially affecting the concentration levels of other beer components, such as ethanol. Accordingly, in a preferred embodiment the ethanol content of the beer is virtually unaffected by steps b) and c) of the present method. Here 'virtually unaffected', means that the ethanol content of the beer is changed by not more than 5%. In case of a beer with an initial ethanol content of 7 vol % this condition implies that the process steps b) and c) yield a flavour adjusted beer having an alcohol content in the range of 6.65-7.35 vol. %. More preferably, the ethanol content of the beer changes by not more than 3%, and most preferably by not more than 1% by process steps b) and c).

The adsorbent particles used in the present method typically have an affinity constant $K_{ethanol}$ of less than 1 L/g adsorbent, more preferably of less than 0.5 L/g adsorbent, even more preferably of less than 0.2 L/g absorbent, and most preferably of less than 0.1 L/g adsorbent.

The adsorbent particles employed in accordance with the present invention preferably have an affinity constant $K_{ads}$ for at least one of the aforementioned beer flavour substances of at least 0.5 L/g adsorbent, more preferably of at least 0.8 L/g adsorbent, even more preferably of at least 1.2 L/g adsorbent, yet more preferably of at least 1.8 L/g adsorbent, and most preferably of at least 3.5 L/g adsorbent.

In a preferred embodiment, the adsorbent particles have a high affinity constant as defined herein before for one or more esters selected from ethyl acetate, isoamyl acetate, ethyl valerate and ethyl hexanoate, more preferably for one or more esters selected from isoamyl acetate, ethyl valerate and ethyl hexanoate, and most preferably for isoamyl acetate.

In another preferred embodiment, the adsorbent particles have a high affinity constant as defined herein before for diacetyl and/or acetaldehyde.

Selective desorption of the beer flavour substances adsorbed by the adsorbent particles is advantageously achieved by passing an eluent through a bed of these adsorbent particles under conditions that favour desorption of a subset of the beer flavour substances that are adsorbed onto the particles. Thus, for instance, adsorbent particles containing ethyl acetate, ethyl hexaonate, ethyl valerate and isoamyl acetate can suitably be desorbed under conditions that favour desorption of ethyl hexanoate, ethyl valerate and isoamyl acetate. Thus, these flavour esters may almost quantitatively be removed and separated from the ethyl acetate. Add-back of these three flavour esters to the beer from which they were originally removed yields a beer that has a reduced ethyl acetate content.

The eluent employed to desorb beef flavour substances from a bed of adsorbent particles is preferably selected from water, ethanol, mixtures of water and ethanol, wort, beer (including alcohol free beer), liquefied gas (e.g. liquefied carbon dioxide) and supercritical fluid (e.g. supercritical carbon dioxide). In order to trigger the successive release of different beer flavour substances elution conditions may be changed during the desorption process. For instance, the composition of the eluent may be changed, e.g. by varying the ethanol content. Successive release may also be achieved by changing the temperature conditions, notably by changing the temperature of the eluent.

The present invention also encompasses desorption of beer flavour substances from the adsorbent particles by passing a gas stream over these particles. Preferably the gas stream is composed of air, carbon dioxide, nitrogen or a combination thereof.

The flavour adjusted beer that is obtained by the present method typically contains the following beer flavour substances in the indicated concentrations:

0-1 mg/l diacetyl;
0-10 mg/l acetaldehyde;
0-100 μg/l dimethyl sulfide;
0-80 mg/l ethyl acetate;
0.1-20 mg/l isoamyl acetate;
0-10 μg/l ethyl valerate;
0-5 mg/l ethyl hexanoate;
0-200 mg/l amyl alcohols.

The present treatment with adsorbent particles produces a clearly perceptible impact on beer flavour quality if the concentration level of at least one of the beer flavour substances is reduced by at least 20%. Accordingly, in a particularly preferred embodiment of the present invention at least 30%, more preferably at least 40% and most preferably at least 50% of one of the beer flavour substances is removed from the beer together with the adsorbent particles, said percentage being calculated on the total concentration of the flavour substance contained in the flavour adjusted beer and the separated adsorbent particles.

The present method can suitably employ adsorbent particles made from different materials. Preferably, these adsorbent particles are polymer based, meaning that the particles consist of polymer of that at least the surface of the particles consists of polymer.

Examples of polymers that can suitably be employed in the adsorbent particles, especially to selectively remove beer flavour esters, include polystyrenes, polyphenol formaldehyde based polymers (e.g. XAD761), polymethacrylates (e.g. DIAION HP2MG), mixture and copolymers thereof. More preferably, the adsorbent particles are made from cross-linked polystyrene, most preferably a styrene-divinylbenzene copolymer.

Adsorbents that can suitably be used in the adsorbent particles, especially to selectively remove diacetyl, acetaldehyde and/or dimethyl sulfide, include adsorbents containing amine functionalities. Examples of such adsorbents include chitosan, Sevalamer™ (copolymer of 2-(chloromethyl) oxirane(epichlorohydrin) and prop-2-en-1-amine) and Siliabond™ amine functionalised silicagels.

The porous adsorbent particles employed in the present method typically have a pore radius of at least 20 Å.

The specific surface area of the adsorbent particles preferably is at least 50 $m^2/g$, more preferably at least 100 $m^2/g$ and most preferably 200-2,000 $m^2/g$.

The adsorbent particles typically have a porosity of at least 0.2 ml/ml, more preferably of 0.3-8.8 ml/ml and most preferably of 0.35-0.75 ml/g.

As regards the particle size of the adsorbent particles it is preferred that at least 80 wt. % of the adsorbent particles has a diameter in the range of 5-5,000 μm, more preferably in the range of 10-1,000 μm and most preferably in the range of 15-500 μm.

In a particularly preferred embodiment of the present method, the fermenting wort or the beer is also contacted with polyvinylpolypyrrolidone (PVPP) particles and the adsorbent particles and PVPP particles are removed at the same time. Thus, the method preferably comprises adding PVPP particles to the fermenting wort or the beer, and wherein the adsorbent particles and the PVPP particles are simultaneously separated from the beer. After the adsorbent particles containing one or more adsorbed beer flavour substances have been separated from the beer, the flavour adjusted beer so obtained can be bottled or barrelled, optionally after having undergone further processing steps, such as conditioning. Advantageously, the flavour adjusted beer is conditioned at a temperature of less than 5° C. for at least 1 day prior to the bottling or barrelling.

The present invention also encompasses and embodiment in which the adsorbent particles are contacted with the beer after the beer has been conditioned and wherein the adsorbent particles containing one or more adsorbed beer flavour substances are separated from the beer prior to the bottling or barrelling. In a preferred embodiment, the adsorbent particles are separated in a filtration step that simultaneously clarifies the beer.

In another advantageous embodiment of the present brewing method, the adsorbent particles containing adsorbed flavour substances are desorbed so the adsorbent particles may be regenerated for re-use in the brewing method.

In a particularly preferred embodiment, the adsorbent particles containing one or more adsorbed beer flavour substances are treated to remove said one or more adsorbed flavour substances and the treated adsorbent particles are re-used in the method, said treatment comprising:

contacting the separated adsorbent particles containing one or more adsorbed beer flavour substances with a liquid solvent and desorbing said adsorbed beer flavour substances into the liquid solvent; and separating the desorbed adsorbent particles from the liquid solvent containing the desorbed beer flavour substances.

The present method is advantageously operated at an industrial scale. Accordingly, the amount of fermenting wort or the amount of beer that is contacted with the adsorbent particles in the present method preferably exceeds 10 hl.

The present invention also pertains to the beer that is obtained by the brewing method of the present invention.

Yet another aspect of the present invention relates to the use of porous adsorbent particles to selectively remove one or more beer flavour substances from fermenting wort or from beer, said one or more flavour substances being selected from diacetyl; acetaldehyde; dimethyl sulfide; ethyl valerate; ethyl hexanoate; isoamyl acetate; iso-amyl alcohol; and 2-methylbutan-1-ol.

The preferred conditions for this particular use of the porous adsorbent particles have already been described herein. Likewise, also the preferred adsorbent particles have already been described.

The invention is further illustrated by the following non-limiting examples.

EXAMPLES

Example 1

Experiments were conducted to study the interaction of 5 beer flavour substances (Ethyl Acetate, Diacetyl, Isobutyl Alcohol, Isoamyl Acetate, Isoamyl Alcohol) in a co-solvent mixture of ethanol/water with different commercially available food-grade resins under conditions that are representative of those found in beer.

Below the results are summarized for three different resins that showed a high affinity for Isoamyl Acetate and a clear differentiation in affinities for the 5 flavour substances tested.

A model solution containing the 5 flavour substances (each in approximately a concentration of 2 g/L) in 4 w/v % mixtures of ethanol/water was prepared for the determination of adsorption isotherms.

Three food-grade resins were used for the tests:

Amberlite XAD16N (20-60) mesh, purchased from Sigma-Aldrich

XAD7 HP, purchased from Sigma-Aldrich;

Sepabeads SP20-SS, purchased from Sigma-Aldrich (Supelco)

Microtiter plates (96 microtiter deep-well plate filter 2 ml ex Millipore USA) were filled with the selected resins, mass of each resin being equal to mass of the calibrated volume of the Titan 96 well Resin loader (Radleys. UK) (0.0874 g of the resin for Sepabeads SP20-SS, 0.0964 g for XAD16N and 0.0751 g for XAD7HP. The resins were pretreated by washing steps with methanol, followed by an equilibration step with water.

After the pretreatment, the deep-well plates including the resins, were loaded with 1800 μL of different dilutions (dilution factors of 0.67) of the beer flavour solutions (different dilutions of the prepared samples are also added to different wells of the 96-well micro-titer plate as blank to account for the effect of evaporation). Next, the microtiter plate was covered with adhesive aluminum foil to minimize evaporation. The micro-titer plates were stirred at 300 rpm for 30 minutes on a thermo-shaker whilst keeping the temperature at 4° C. to minimize evaporation. Next, the contents of the deep well filter plates were centrifuged into a collecting deep-well plate (VWR International USA) and the collected bulk liquid, and the blank samples were separated for subsequent GC-analysis.

The samples were analyzed using a gas chromatograph (Agilent technologies 6890N series, USA) coupled with FID, and equipped with a Zebron ZB-WAX Plus 20 m×0.18 mm ID×0.18 μm df column. As the carrier gas, Helium was used in the system. The chromatogram showed retention times of 2.4, 2.9, 4.5, 4.8, 6.4, and 2.6 minutes for Ethyl Acetate, Diacetyl, Isobutyl Alcohol, Isoamyl Acetate, Isoamyl Alcohol, and Ethanol, respectively.

To predict the competitive adsorption behaviour of the tested beer flavour substances in a mixture, a multicomponent Langmuir adsorption isotherm model (equation 1) was used: (Sevillano D M, van der Wielen L A M, Hooshyar N, Ottens M., *Resin selection for the separation of caffeine from green tea catechins*, Food and Bioproducts Processing, 92 (2), 192-198, 2014; Tefera, D. T., Z. Hashisho, J. H. Philips, J. E. Anderson and M. Nichols (2014). *Modeling Competitive adsorption of mixtures of volatile organic compounds in a fixed bed of beaded activated carbon*, Environmental Science & Technology 48: 5108-5117, 2014).

$$q_i = \frac{Q_{m,i} K'_i C_{eq,i}}{1 + \sum_{j=1}^{n} K'_j C_{eq,j}}$$

The multi-component adsorption isotherm parameters were regressed for the tested flavour substances from their experimental adsorption on the tested resins.

BRIEF DESCRIPTION OF THE FIGURES

The multi-component adsorption isotherm parameters were regressed for the tested flavour substances from their experimental adsorption on the tested resins. For each of the tested resins the isotherms for the different flavour substances are shown in FIG. 1a-3b.

In addition, for each of the resins the calculated loads were plotted versus experimental loads and depicted in the Pareto plots shown in FIGS. 4, 5 and 6.

Figure 1A:
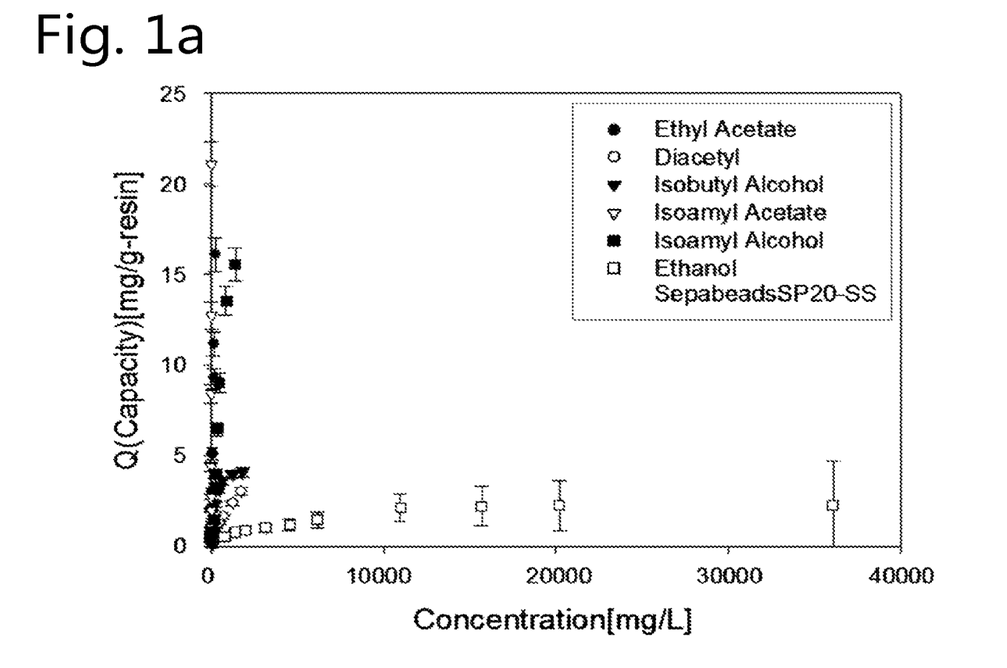
FIG. 1a, isotherm SP20-SS (low concentration range)
FIG. 1b, isotherm SP20-SS (high concentration range)
FIG. 2a, isotherm XAD7HP (low concentration range)
FIG. 2b, isotherm XAD7HP (high concentration range)
FIG. 3a, isotherm XAD16N (low concentration range)
FIG. 3b, isotherm XAD16N (high concentration range)
Figure 1B:
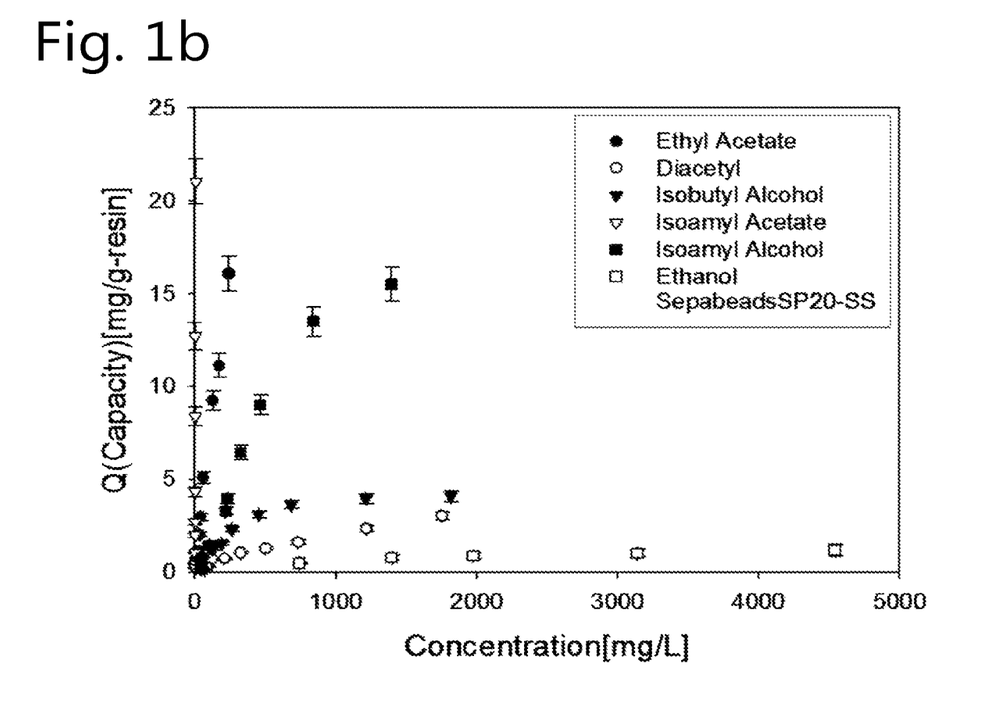
Figure 2A:
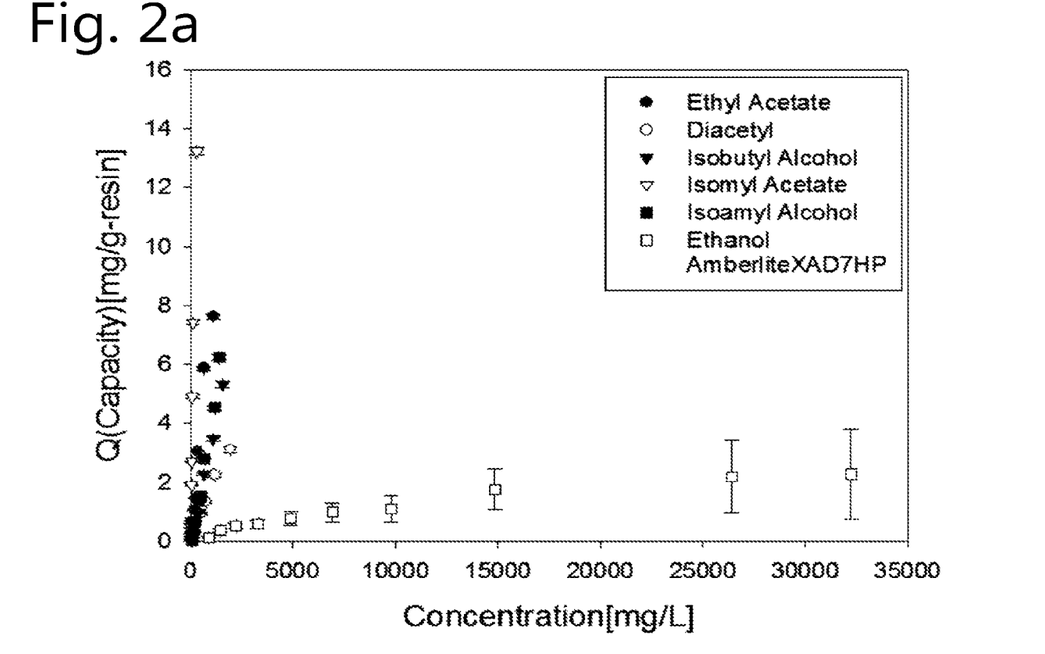
Figure 2B:
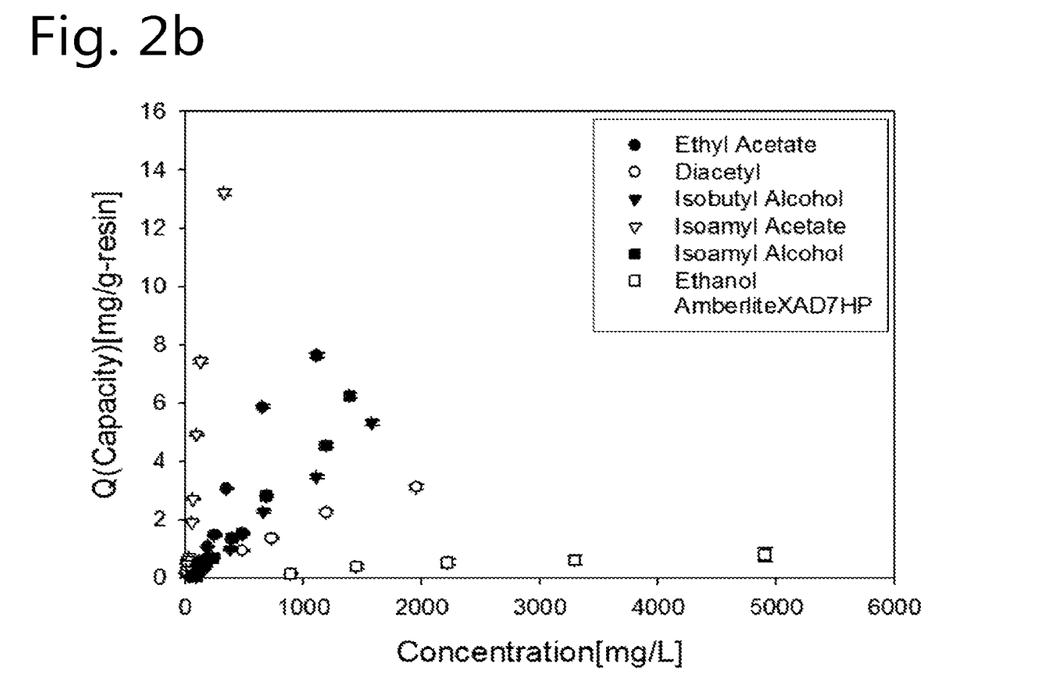
Figure 3A:
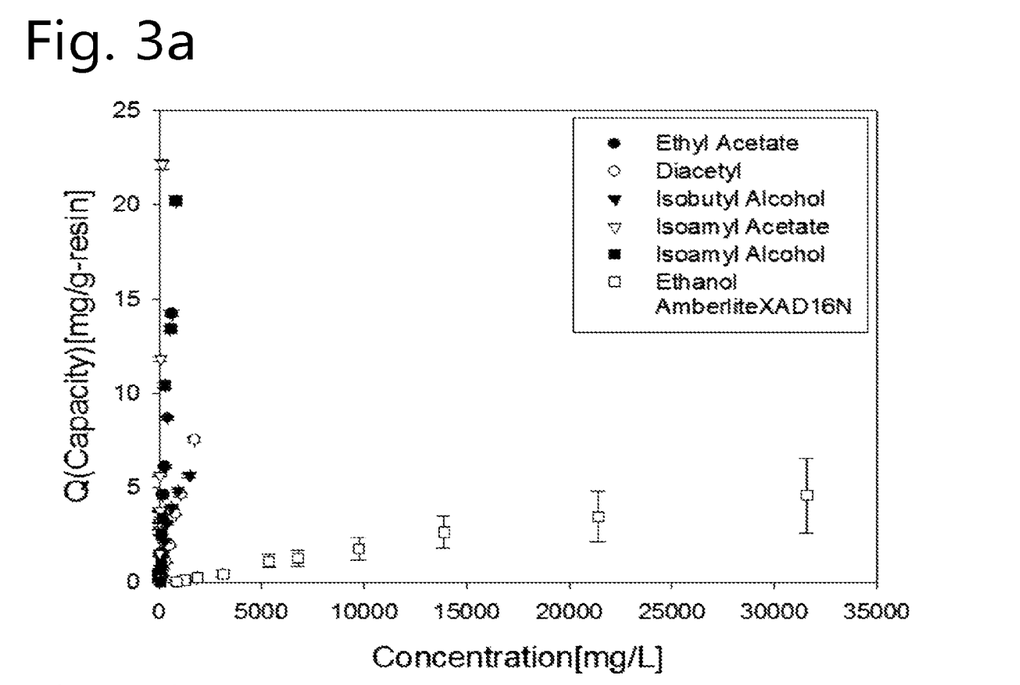
Figure 3B:
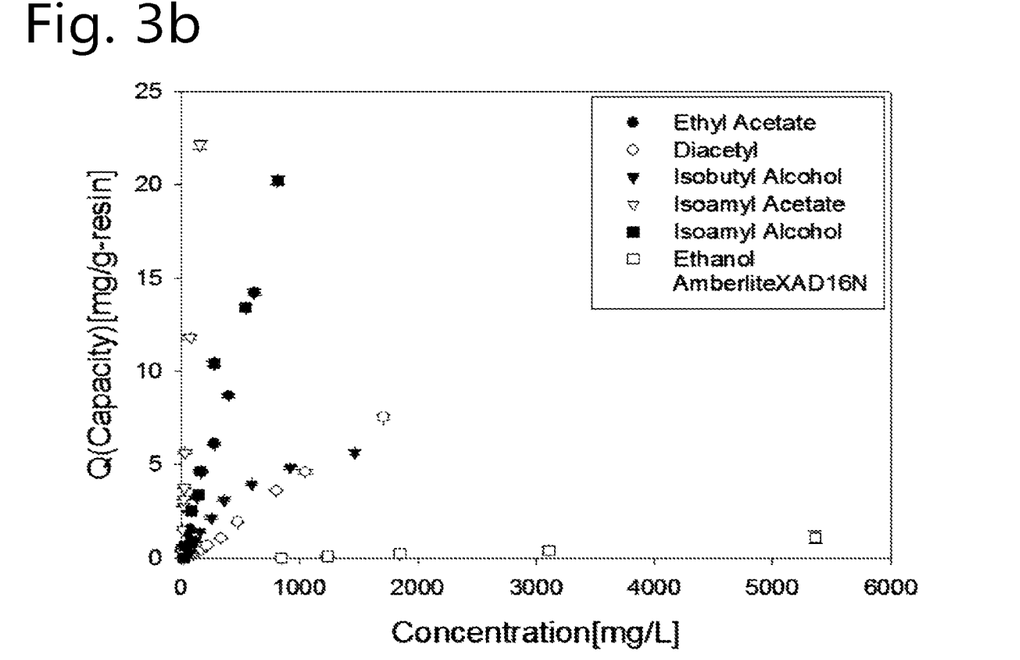
Figure 4:
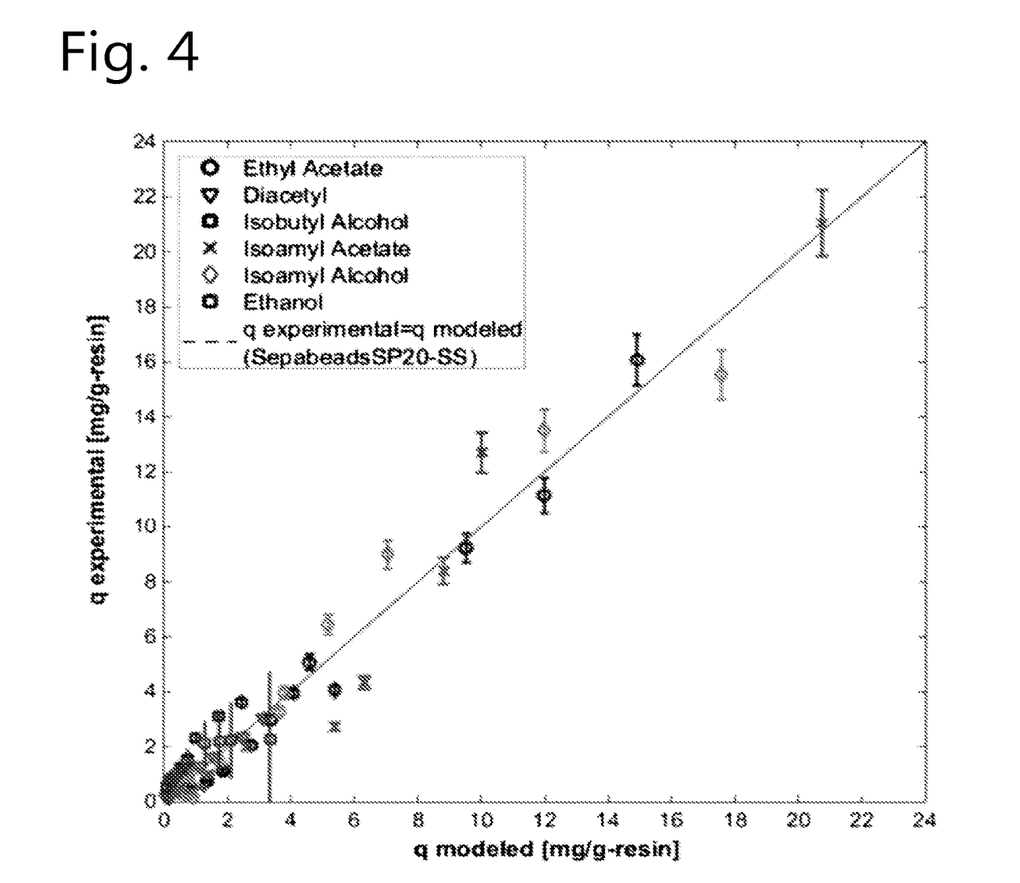
FIG. 4: SP20-SS
Figure 5:
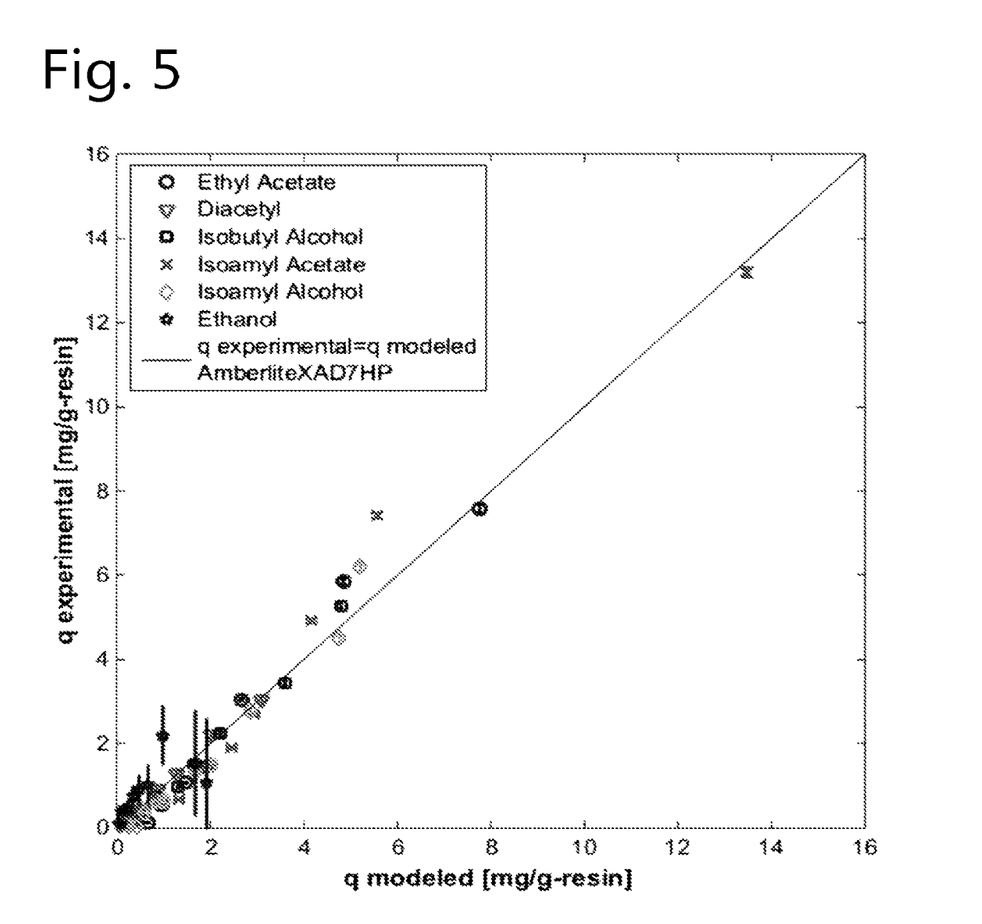
FIG. 5: XAD7HP
Figure 6:
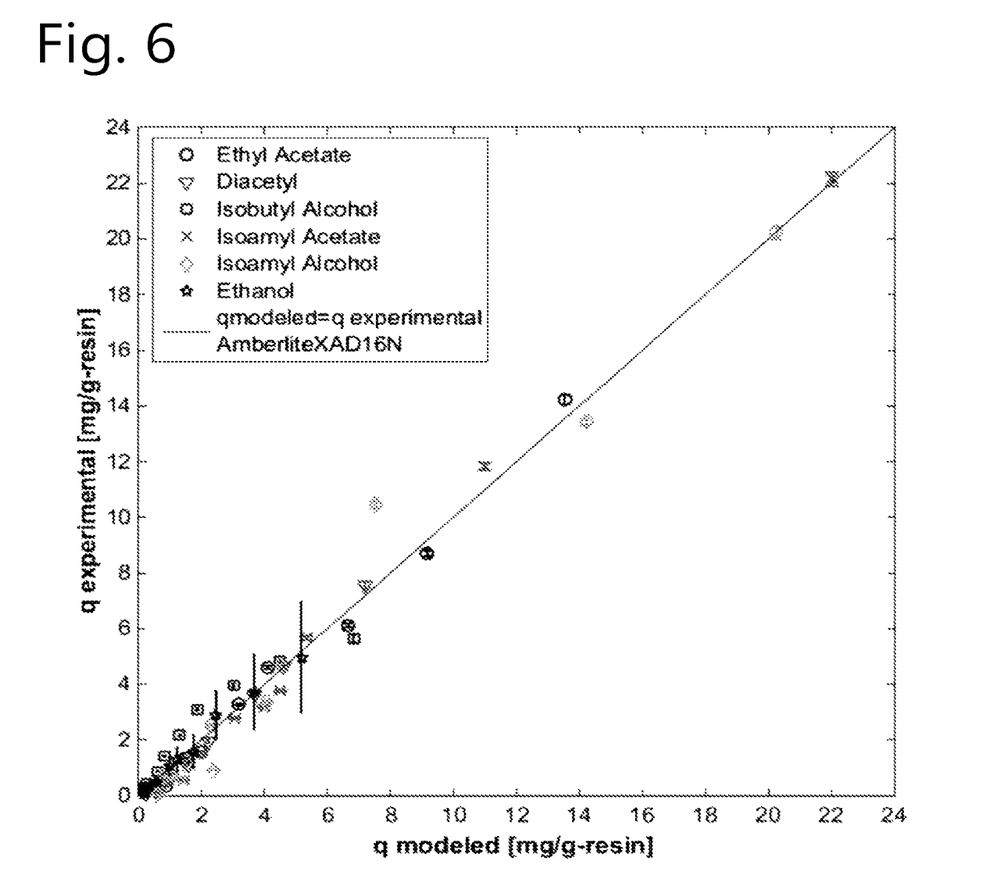
FIG. 6: XAD16N

The affinity constant ($K_i$; $K_i=(q/c)\lim c \to 0$; being the initial slope of the isotherm) was obtained via regressing the multi-component Langmuir isotherm parameters from experimental data from batch uptake experiments using MATLAB software version 8.0.0.873. The regressed affinity constants (in L.g_resin$^{-1}$) are shown in Table 1.

TABLE 1

|  | Sepabeads SP20-SS | XAD16N | XAD7HP |
|---|---|---|---|
| Ethyl acetate | 0.0857 | 0.0245 | 0.0084 |
| Diacetyl | 0.0025 | 0.0047 | 0.0019 |
| Isobutyl alcohol | 0.0041 | 0.0052 | 0.0037 |
| Isoamyl acetate | 7.0604 | 0.1557 | 0.0500 |
| Isoamyl alcohol | 0.0175 | 0.0280 | 0.0045 |
| Ethanol | 0.0001 | 0.0002 | 0.0001 |

Example 2

In a typical process, lager beer is produced by fermentation followed by a conditioning step at low temperature (<4° C.) for several days. The beer is subsequently filtered to remove visible yeast cells and protein agglomerates which cause turbidity, by a clarifying filtration step.

The beer contains 5% (v/v) ethanol, 25 mg/l ethyl acetate and 4 mg/l isoamyacetate, which implies that the ester ratio ethylacetate/isoamylacetate equals 6.25.

The beer is mixed with adsorbent particles (Amberlite XAD7HP, 10 g per hl of beer). After the completion of the adsorption step, the beer containing the adsorbent particles is passed over a filter with a filter mesh which is sufficiently small to retain these adsorbent particles.

Analysis of the beer after removal of the adsorbent particles shows that concentration levels of both ethyl acetate and isoamyl acetate have been reduced by the contacting with the adsorbent particles. The adsorbent particles are found to have had a stronger affinity of isoamyacetate than ethyl acetate as the ratio of ethyl acetate over isoamyl acetate is increased by the contacting with the adsorbent particles to a value of approximately 10. Also the flavour profile of the beer is changed significantly as a result of the treatment with adsorbent particles.

Example 3

Example 2 is repeated, except that this time the adsorbent particles are collected from the filter mesh and transferred into an elution column. Next, the bed of adsorbent particles is eluted with a mixture of beer and ethanol.

During elution both temperature of the eluent mixture and the ethanol content of the mixture are varied. During elution fractions of eluate are collected. The concentrations of ethyl acetate and isoamyl acetate as well as the weight ratio in which these two esters occur in the collected fractions are found to differ substantially.

Fractions having a relatively high isoamyl acetate content (compared to ethyl acetate content) are added to the original beer to obtain a beer having a higher concentration ratio [isoamyl acetate]/[ethyl acetate] than the original beer.

Example 4

A filtered lager beer was treated with two different particulate adsorbents with functional amine groups (Chitosan and Siliabond® diamine). 100 ml of beer was mixed with the adsorbents under stirring at 3-5° C.

After incubation the mixtures were filtered over a paper filter. The effect of the adsorbent treatment on the concentrations of the beer flavour substances was determined by GC analysis. Tables 2a and 2b show the adsorbent dosage levels that were tested and the impact of the contacting with the adsorbents on ethanol content and on the concentration levels of 6 beer flavour substances.

TABLE 2a

|  | Effect on concentration | |
|---|---|---|
| Chitosan | 0.5 g/100 ml | 5 g/100 ml |
| Acetaldehyde | −12.3% | −75.4% |
| Dimethyl sulfide | −19.5% | −50.6% |
| Ethyl acetate | −3.2% | −19.3% |
| Iso-amyl acetate | −5.9% | −24.1% |
| Iso-butanol | −5.1% | −3.1% |

TABLE 2a-continued

|  | Effect on concentration | |
|---|---|---|
| Chitosan | 0.5 g/100 ml | 5 g/100 ml |
| Amyl alcohols | −3.6% | −3.1% |
| Ethanol | 0.9% | −3.1% |

TABLE 2b

| Siliabon ® diamine | Effect on conc. 2.5 g/100 ml |
|---|---|
| Acetaldehyde | −68.4% |
| Dimethyl sulfide | −49.4% |
| Ethyl acetate | −11.4% |
| Iso-amyl acetate | −11.2% |
| Iso-butanol | −5.1% |
| Amyl alcohols | −6.5% |
| Ethanol | 6.9% |

Example 4

Adsorption tests were carried out using model solutions containing a mixture of three off-flavour components. An aqueous model solution was prepared containing 20 mg/L acetaldehyde, 20 mg/L diacetyl and 0.3-0.4 mg/L 2-nonenal. 100 ml of this model solution was mixed with particulate adsorbents under stirring at 3-5° C.

After incubation, the mixtures were filtered over a paper filter. The effect of the adsorbent treatment on the concentrations of the beer flavour substances was determined by GC analysis. Table 3 shows the adsorbent dosage levels that were tested and the impact of the contacting with the adsorbents on ethanol content and on the concentration levels of 6 beer flavour substances.

TABLE 3

| Resin | Dosage g/100 ml | Relative reductions in concentration | | |
|---|---|---|---|---|
|  |  | Acetaldehyde | diacetyl | nonenal |
| Chitosan | 0.5 | −42% | 0 | 0% |
|  | 5 | −65% | −43% | −99% |
| Sevalamer | 0.5 | −79% | −31% | −83% |
|  | 5 | −100% | −94% | −100% |
| Siliabond ™ amine | 0.5 | 0 | −100% | −99% |
| Siliabond ™ diamine | 0.5 | −100% | −100% | −99% |
| Siliabond ™ Tosylhydrazine | 0.5 | −88% | −60% | −100% |

Example 5

Samples were taken form a fermenting lager beer at different stages of fermentation and the levels of beer flavour substances in these samples were determined by means of GC-analysis. The results are shown in Table 4

TABLE 4

| Fermentation time (days) | Normalised Concentrations (C/Cfinal) | | | | | | |
|---|---|---|---|---|---|---|---|
|  | Ethyl acetate | Isoamyl acetate | Acetaldehyde | DMS | i-Butanol | Amyl alcohols | Ethyl hexanoate |
| 1.2 | 0.07 | 0.06 | 0.76 | 0.75 | 0.16 | 0.24 | 0.05 |
| 2.2 | 0.27 | 0.30 | 0.79 | 0.75 | 0.32 | 0.58 | 0.26 |
| 3.2 | 0.73 | 0.77 | 0.75 | 0.75 | 0.70 | 0.89 | 0.79 |
| 4.2 | 1.00 | 1.00 | 1.00 | 1.00 | 1.00 | 1.00 | 1.00 |

This data shows that acetaldehyde and dimethyl sulfide are largely formed during the initial stage of fermentation. Also the higher alcohols (iso butyl alcohol and amilic alcohols) are largely formed during the first two days of fermentation whereas the flavour esters are largely formed at the end of the fermentation process (days 3 and 4).

The data indicates that addition of adsorbent particles having affinity for acetaldehyde and/or dimethyl sulfide at the very beginning of the fermentation process and removal of the particles at the end of the first fermentation day will inherently favour selective removal of acetaldehyde and/or dimethyl sulfides as the treatment will have little effect on, for instance, the concentration levels of flavour esters as these are largely formed after the treatment.

Example 6

A lager beer is produced by process that comprises fermentation of wort and removal of yeast from the beer. Next, the beer cooled own and conditioned at a temperature below 4° C., followed by clarification over a clarifying filter. The clarified beer is then heated to a temperature of 65-70° C.) to convert residual acetolactate into diacetyl.

Next, the heated beer is treated with 100 g/hl of Siliabond® diamine to remove diacetyl. After incubation the adsorbent particles are removed by means of filtration.

What is claimed is:
1. A method of producing beer, comprising the successive steps of:
  (a) fermenting a wort containing fermentable sugars with an active yeast to produce a beer comprising 1-10 vol. % ethanol and beer flavour substances diacetyl, acetaldehyde, dimethyl sulphide, ethyl acetate, isoamyl acetate, ethyl valerate, ethyl hexanoate, iso-amyl alcohol, and 2-methylbutan-1-ol;
  (b) contacting the fermenting wort or the beer with porous adsorbent particles to selectively adsorb one or more surplus flavour substances selected from diacetyl, acetaldehyde, and dimethyl sulphide, the adsorbent particles having a high affinity for one or more of the surplus flavour substances and a lower affinity for ethanol and the other beer flavour substances; and
  (c) separating the adsorbent particles containing the one or more adsorbed surplus flavour substances from the beer to produce a flavour adjusted beer comprising 1-10 vol. % ethanol;
  wherein the porous adsorbent particles comprise an adsorbent containing amine functionalities; and wherein the adsorbent particles' affinity ratio Oi for at least one of the surplus flavour substances exceeds 5;
  the affinity ratio $\theta_1$ for surplus flavour substance i being defined by the following equation: $\theta_i = K_i/K_{ethanol}$, wherein:
  (i) $K_i$ represents the adsorbent particles' affinity constant for surplus flavour substance i; and

(ii) $K_{ethanol}$ represents the adsorbent particles' affinity constant for ethanol.

2. The method according to claim 1, wherein the beer is contacted with the porous adsorbent particles.

3. The method according to claim 2, wherein the beer is contacted with the adsorbent particles after the beer has been heated to a temperature of at least 60° C. for at least 5 minutes.

4. The method according to claim 1, wherein the affinity ratio $\theta_i$ for diacetyl exceeds 5.

5. The method according to claim 4, wherein the affinity ratio $\theta_i$ for diacetyl exceeds 10.

6. The method according to claim 1, wherein the adsorbent particles have an affinity constant for diacetyl that is at least 3 times higher than the particles' affinity constant for ethyl acetate.

7. The method according to claim 1, wherein the affinity ratio $\theta_i$ for acetaldehyde exceeds 5.

8. The method according to claim 7, wherein the affinity ratio $\theta_i$ for acetaldehyde exceeds 10.

9. The method according to claim 1, wherein the affinity ratio $\theta_i$ for dimethyl sulfide exceeds 5.

10. The method according to claim 9, wherein the affinity ratio $\theta_i$ for dimethyl sulfide exceeds 10.

11. The method according to claim 1, wherein yeast is separated from the beer before the beer is contacted with the adsorbent particles.

12. The method according to claim 1, wherein yeast and the adsorbent particles are simultaneously separated from the beer to produce the flavour adjusted beer.

13. The method according to claim 1, wherein the adsorbent particles consist of polymer or the surface of the adsorbent particles consists of polymer.

14. The method according to claim 1, wherein the adsorbent containing amine functionalities are selected from chitosan, Sevalamer™ (copolymer of 2-(chloromethyl)oxirane(epichlorohydrin) and prop-2-en-1-amine) and Siliabond™ amine functionalised silica gels.

15. The method according to claim 1, wherein the adsorbent particles have specific surface area of at least 50 $m^2/g$.

16. The method according to claim 1, wherein at least 80 wt. % of the adsorbent particles has a diameter in the range of 5-5,000 μm.

* * * * *